Dec. 10, 1968 J. P. MOORHEAD ET AL Re. 26,500

FREIGHT BRACING APPARATUS

Original Filed March 22, 1963 6 Sheets-Sheet 1

INVENTORS.
John P. Moorhead
Jackson H. Stook.
BY
Harness, Dickey & Pierce.
ATTORNEYS

FREIGHT BRACING APPARATUS

Original Filed March 22, 1963 6 Sheets-Sheet 2

INVENTORS
John P. Moorhead
Jackson A. Shook
BY
Carmody, Dickey & Purie.
ATTORNEYS.

FREIGHT BRACING APPARATUS
Original Filed March 22, 1963 6 Sheets-Sheet 3
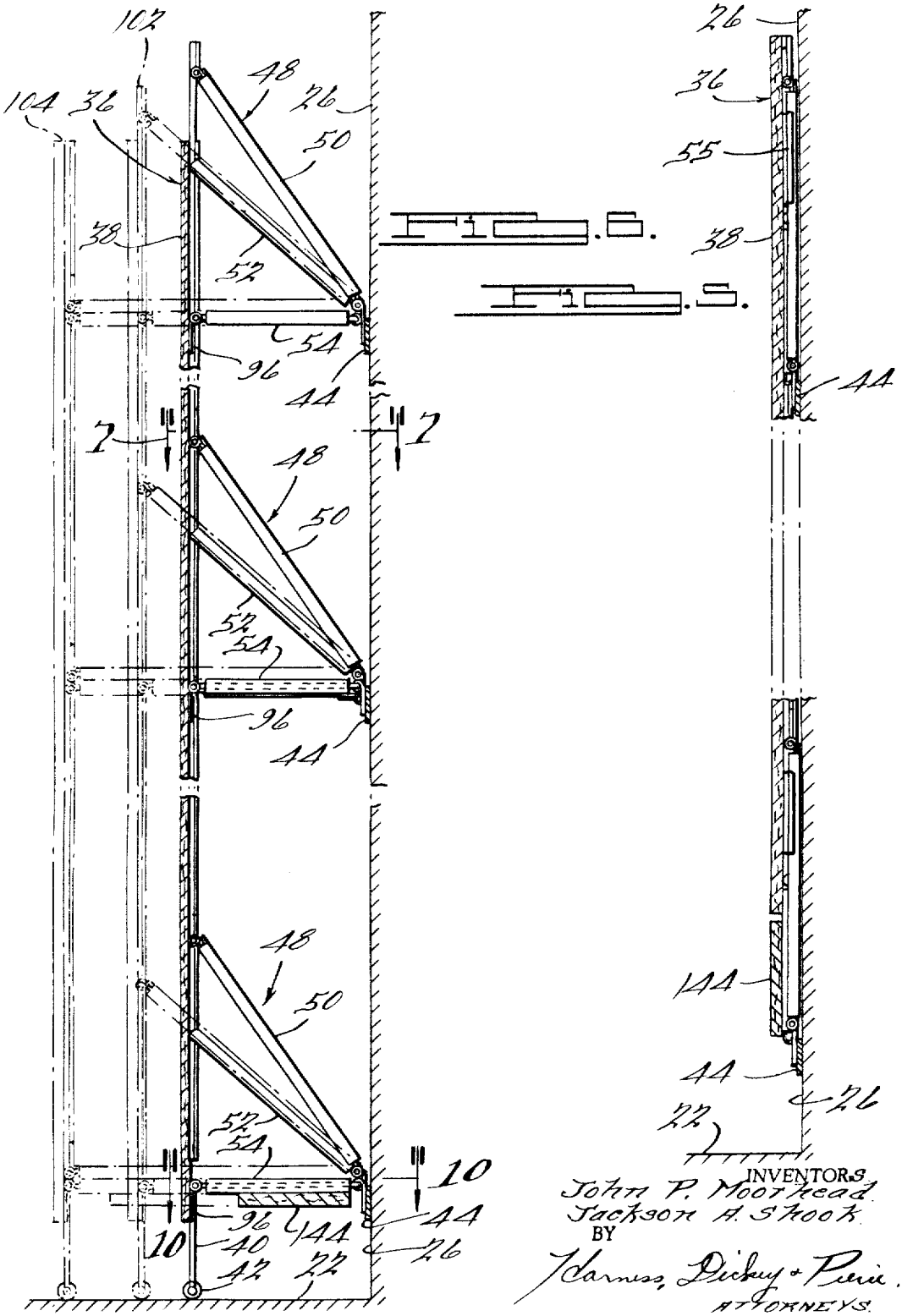

FREIGHT BRACING APPARATUS

Original Filed March 22, 1963 6 Sheets-Sheet 4

INVENTORS.
John P. Moorhead
Jackson A. Shook
BY
Harness, Dickey & Pierce.
ATTORNEYS.

FREIGHT BRACING APPARATUS

Original Filed March 22, 1963 6 Sheets-Sheet 5

INVENTORS
John P. Moorhead
Jackson A. Shook
BY
Harness, Dickey & Pierce
ATTORNEYS FREIGHT BRACING APPARATUS
Original Filed March 22, 1963 6 Sheets-Sheet 6
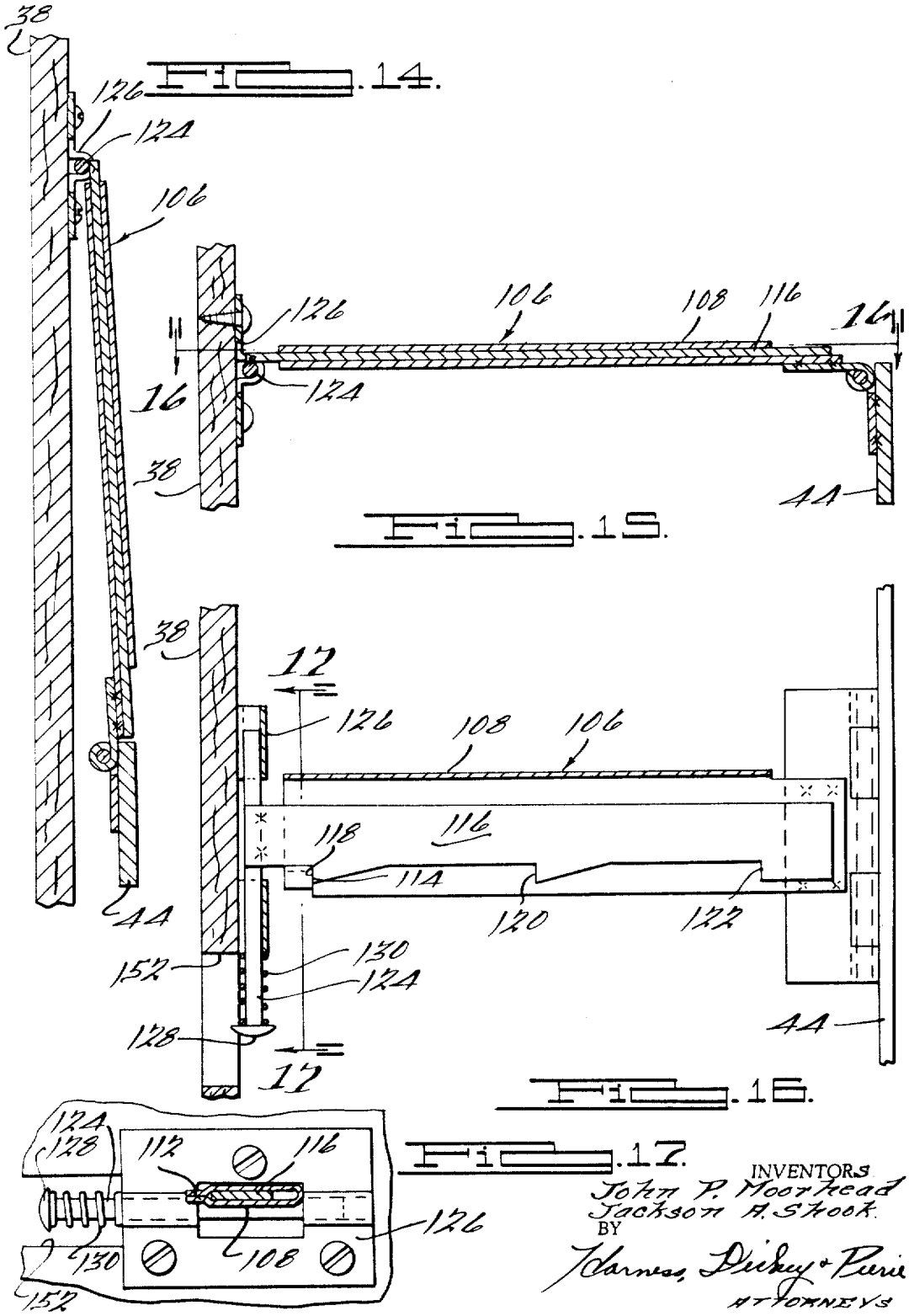
INVENTORS
John P. Moorhead
Jackson A. Shook
BY
Harness, Dickey & Pierce
ATTORNEYS United States Patent Office Re. 26,500
Reissued Dec. 10, 1968

26,500
FREIGHT BRACING APPARATUS

John P. Moorhead and Jackson A. Shock, Northville, Mich, assignors to Evans Products Company, Plymouth, Mich., a corporation of Delaware Original No. 3,151,572, dated Oct. 6, 1964, Ser. No. 267,155, Mar. 22, 1963. Application for reissue Aug. 8, 1966, Ser. No. 574,266
12 Claims. (Cl. 105—369)

Matter enclosed in heavy brackets [ ] appears in the original patent but forms no part of this reissue specification; matter printed in italics indicates the additions made by reissue.

*ABSTRACT OF THE DISCLOSURE*

*A cargo bracing system for a railway car including a plurality of sidefiller assemblies supported by one of the car walls for bracing cargo positioned between the opposing wall and the sidefiller assembly. Each of the sidefiller assemblies is supported adjacent the wall by a latch mechanism in a retracted position and is movable to a plurality of operative positions spaced different distances from the walls by a plurality of leaves which coact to lock the panel in its respective bracing positions. A roller support is additionally provided to maintain the panel in a substantially fixed vertical position relative to the floor in each of its bracing positions.*

The present invention relates to freight bracing apparatus and more particularly, to such apparatus of the type generally known as side wall fillers.

More specifically, the present invention relates to an improved side wall filler adapted to be permanently mounted on the side wall of a railway freight car or truck body, or other wall cooperating in defining a freight receiving chamber where it is desired to employ the side wall filler to take up space between the freight or merchandise and the side wall.

It is an object of the present invention to provide an improved side wall filler of the above mentioned type which may be readily moved between a stored position, in which it is disposed closely adjacent the side wall, and a plurality of operative positions in which it is disposed parallel to and at selected desired distances from the side wall.

Another object of the present invention is to provide such a side wall filler which may be readily installed, which is easy to operate, or move between its various possible positions, and which may be economically manufactured.

A further object of the present invention is to provide a side wall filler of the above mentioned type having improved means for mounting it on the side wall and holding it in its various positions of adjustment.

Other and more detailed objects of the present invention will be apparent to those skilled in the art from a consideration of the following specification, the appended claims, and the accompanying drawings wherein:

FIGURE 3 is a broken transverse sectional view of a portion of the boxcar taken above and looking down on side wall fillers mounted along one side wall of the boxcar and showing the various positions of adjustment of the side wall fillers;

FIGURE 6 is a broken enlarged sectional view of the structure illustrated in FIGURE 2 taken substantially along the line 6—6 thereof and showing in broken lines two other adjusted positions of the side wall filler;

Figure 1:
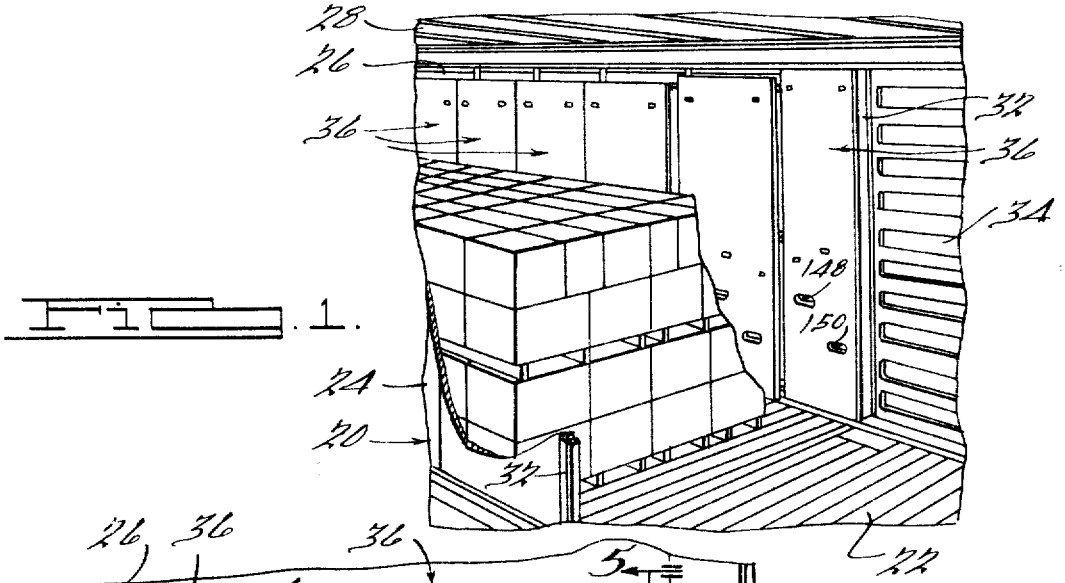
FIGURE 1 is a broken perspective view of a portion of the interior of a railway boxcar showing side wall fillers constructed in accordance with the present invention mounted on a side wall thereof and disposed in different adjusted positions.
Figure 2:
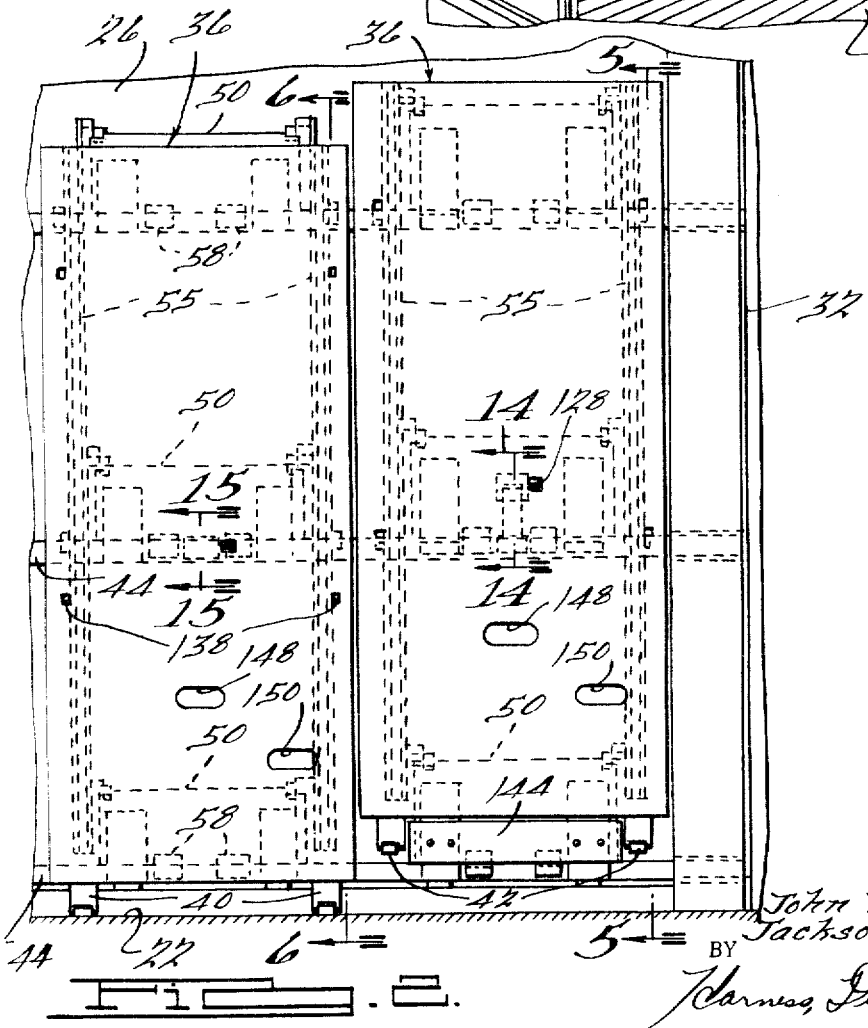
FIGURE 2 is an enlarged broken elevational view taken from the interior of the boxcar and looking at side wall fillers mounted on a side wall of the boxcar.
Figure 7:
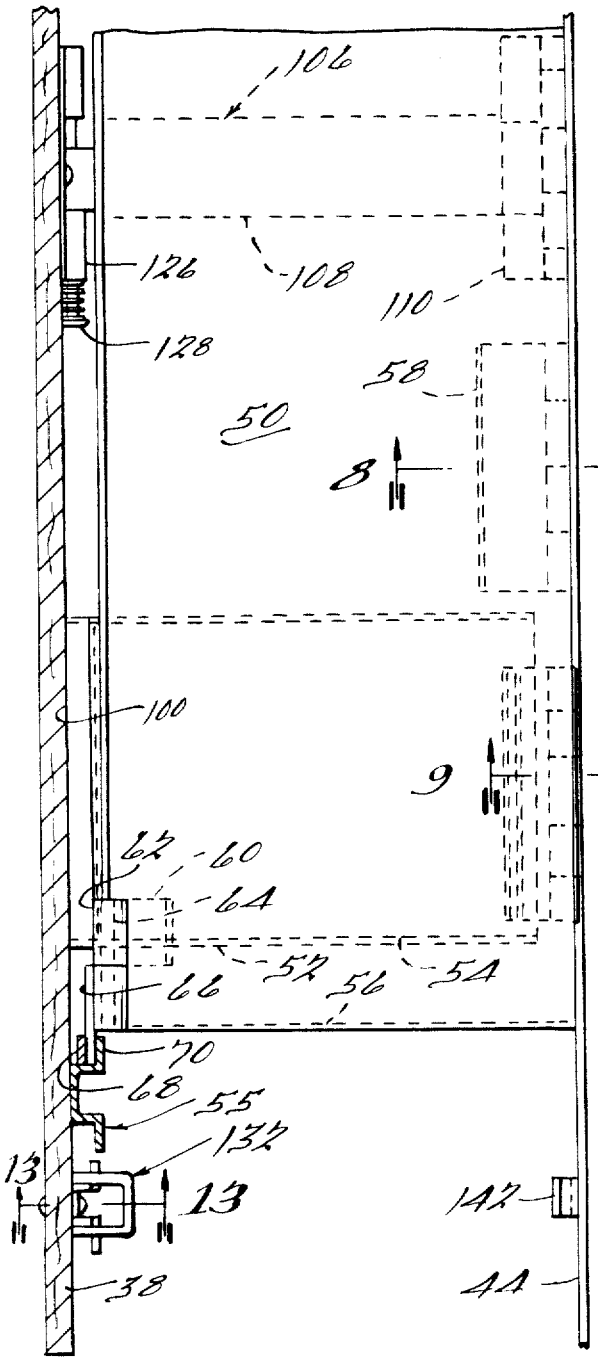
FIGURE 7 is an enlarged broken sectional view of the structure illustrated in FIGURE 6 taken substantially along the line 7—7 thereof.
Figure 8:
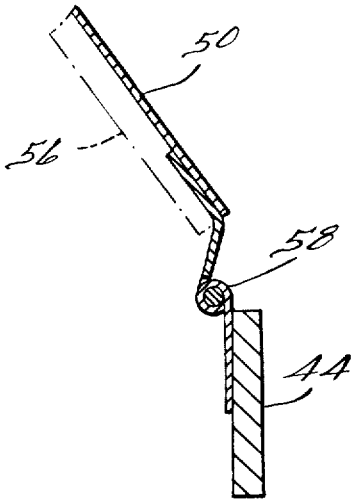
Figure 9:
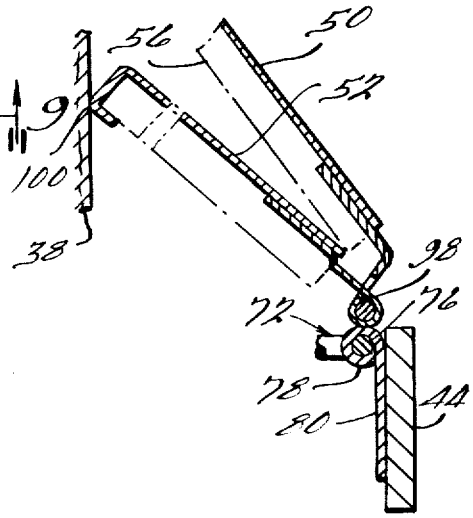
Figure 10:
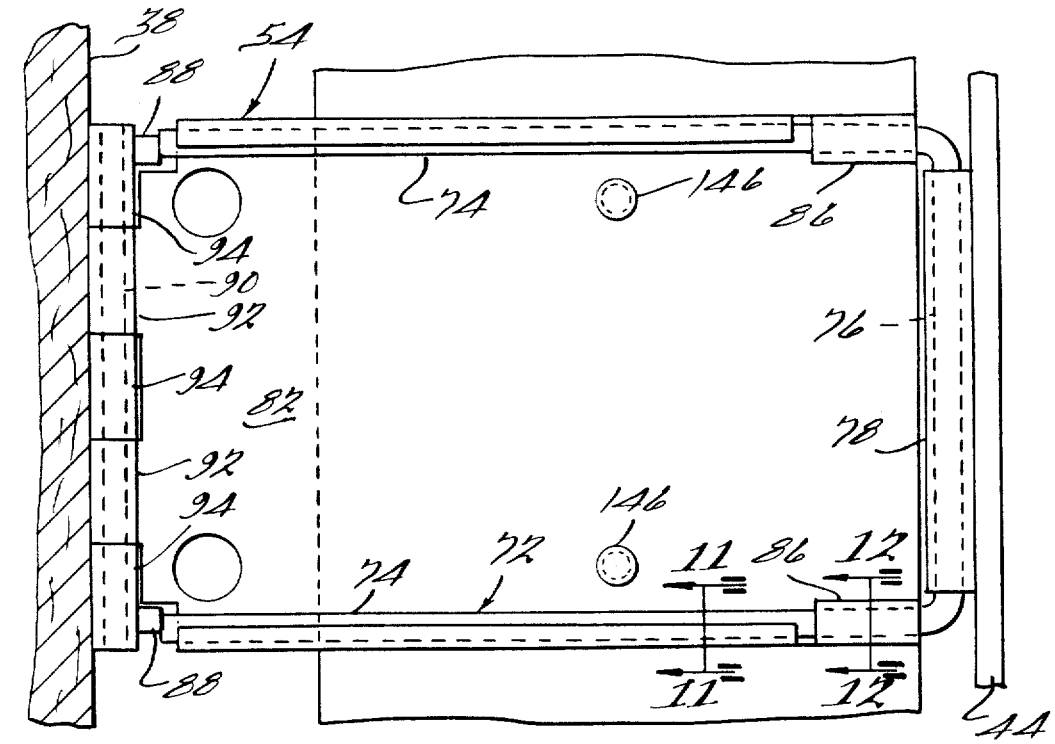
Figure 11:
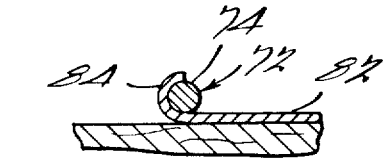
Figure 12:
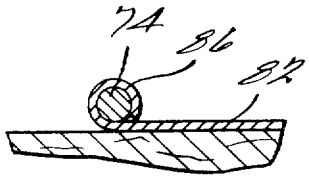
Figure 13:
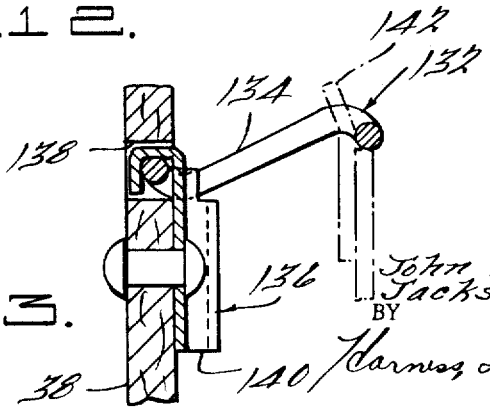

FIGURES 8 and 9 are broken sectional views of the structure illustrated in FIGURE 7 taken substantially along the lines 8—8 and 9—9 thereof, respectively;

FIGURE 10 is a broken sectional view of the structure illustrated in FIGURE 6 taken substantially along the line 10—10 thereof;

FIGURES 11 and 12 are broken sectional views of the structure illustrated in FIGURE 10 taken substantially along the lines 11—11 and 12—12 thereof;

FIGURE 13 is a broken enlarged sectional view of the structure illustrated in FIGURE 7 and taken substantially along the line 13—13 thereof and showing associated structure in broken lines;

FIGURES 14 and 15 are broken enlarged sectional views of the structure illustrated in FIGURE 2 and taken substantially along lines 14—14 and 15—15 thereof, respectively;

FIGURE 16 is a broken sectional view of the structure illustrated in FIGURE 15 taken substantially along the line 16—16 thereof; and, FIGURE 17 is a broken sectional view of the structure illustrated in FIGURE 16 taken substantially along the line 17—17 thereof.

Referring to the drawings, and particularly to FIGURES 1 through 4, inclusive, thereof, the side wall filler of the present invention is herein illustrated and described in an illustrative but not in a limiting sense, as installed in a railway boxcar generally indicated at 20 and comprising a floor 22, spaced side walls 24 and 26, roof structure 28 and an end wall 30. The car includes conventional doorposts 32 defining door openings closed by doors 34. The side wall fillers of the present invention are generally indicated at 36 and in the preferred embodiment illustrated are shown as mounted on the side wall 26.

The side wall filler 36 generally comprises a panel 38 which, in the preferred embodiment illustrated, is formed of a flat sheet of plywood which is movable as hereinafter described between a plurality of positions, in each of which the panel is disposed parallel to and is connected to the side wall 26. The inner face of the panel, that is, the face remote from the adjacent side wall 26 is adapted to engage and support freight or merchandise. The panel is provided with a pair of spaced feet 40 mounted on the outer face thereof and extending downwardly from the lower edge of the panel and carrying a roller 42 at the bottom thereof for supporting the panel on the floor 22 for easy rolling movement between its operative positions (see FIGURE 6). The side wall filler 36 of the present invention also includes three vertically spaced anchor strips 44 which extend horizontally along the side wall 26 and, in the preferred embodiment illustrated, are welded to the Z-shaped vertically disposed structural elements 46 forming a part of the side wall 26. The panel 38 is permanently connected to the anchor strips 44 by attachment assemblies generally indicated at 48. In the preferred embodiment illustrated there are three of these attachment assemblies, all of which are identical and accordingly, only one of these assemblies will be described in detail. Each includes leaves 50, 52 and 54. In each of these attachment assemblies 48 there is a single large upper leaf 50 which extends laterally of the panel 38 substantially the full distance between a pair of elongated vertically extending guide strips 55 of hat-shaped cross section, as best shown in FIGURE 7, which are secured to the outer face of the panel 38 in spaced relation to the vertical edges thereof. This leaf 50 is formed of sheet metal with downwardly turned flanges 56 (see FIGURE 7) at its opposite sides for structural strength and each leaf 59 is pivotally connected to an anchor strip 44 by a pair of hinges 58. At the edge remote from the hinges 58 the leaf 50 is connected to the panel 38 for pivotal and sliding movement relative thereto by journal brackets 60 mounted adjacent the corners of the leaf 50. These journal portions 62 pivotally receive pins 64 carried in pin brackets 66 which are welded or otherwise suitably secured to tying strips 68. These strips extend vertically along the outer face of the panel 38 and are slidably retained under the adjacent flanges 70 of the guide strips 55. The vertical spacing of the pin brackets 66 on the tying strips 68 corresponds to the vertical spacing of the anchor strips 44 so that the large leaves 50 are maintained in parallel relation to each other.

Each of the attachment assemblies 48 also includes a pair of extensible leaves 54 which are spaced laterally of the panel 38. These leaves 54 are disposed to underlie the large leaf 50 inwardly of the flanges 56 at the opposite ends thereof and support the leaf 50 when it is in the horizontal position illustrated and hereinafter described. The construction of the extensible leaf 54 is best illustrated in FIGURES 10, 11 and 12, in which it will be seen that the leaf 54 includes a U-shaped wire frame 72 having a pair of legs 74 and a web portion 76 which extends through a journal portion 78 of a journal plate 80 welded or otherwise suitably secured to an anchor strip 44. The extensible leaf 54 also includes a sheet metal section 82 which has its edge portions 84 folded partially about the legs 74 of the wire frame 72, as best illustrated in FIGURE 11. The sheet metal section 82 also includes journal portions 86 which are folded completely about the legs 74, as best illustrated in FIGURE 12 and which engage offset end portions 88 of the legs 74 to provide a positive stop limiting the extension of the leaf 54. The sheet metal section 82 is pivotally connected to the outer face of the panel 38 for pivotal movement about an axis fixed relative to the panel 38 by a pivot pin 90 which extends through a pair of aligned journal or loop portions 92 integrally formed on the sheet metal section 82 and disposed intermediate and aligned with journal portions 94 of the hinge leaves 96 secured to the outer face of the panel 38.

Each of the attachment assemblies 48 also includes a pair of intermediate leaves 52 which are formed of sheet metal with downwardly turned side flanges adapted to fit over the extensible leaf 54 as illustrated in FIGURE 7. Each of the intermediate leaves 52 is pivotally mounted on the large leaf 50 by a hinge 98 mounting the leaf 50 on the anchor strip 44. The intermediate leaves 52 at the edge thereof remote from the hinges 98 has a reversely turned flange portion 100 extending therealong to provide a smooth outer surface adapted to abut the outer face of the panel 38.

Referring to FIGURE 6, it will now be appreciated that with the extensible leaves 54 in their minimum length position there illustrated in full lines, the leaves 54 hold the panel 38 against movement toward the side wall 26. When the panel 38 is moved out to the position shown in broken linees and indicated at 102, the intermediate leaves 52 have dropped down to a horizontal position in which they overlie and are supported on the extensible leaves 54 and in this position the intermediate leaves 52 prevent movement of the panel 38 toward the side wall 26. In the other position indicated in broken lines and indicated by the reference character 104, the panel 38 is at its maximum distance from the side wall 26 and the large leaves 50 have moved down to a horizontal position in which they overlie the intermediate leaves 52 and the extensible leaves 54 and are supported by the latter, and in this position these leaves 50 hold the panel 38 against movement toward the side wall 26.

The panel 38 is releasably locked in each of the three positions illustrated in FIGURE 6 by the lock mechanism 106 illustrated in FIGURES 14 through 17, inclusive. This lock mechanism 106 comprises a channel-shaped housing 108, one end of which is pivotally supported on the intermediate one of the anchor strips 44 intermediate the hinges 58, by a hinge 110. At its opposite or free end the channel-shaped housing 108 has a short portion of its flanges brought together and welded as indicated at 112 to provide a fixed stop 114 facing the hinged end of the housing 108. A latch strip 116 extends into the open free end of the channel-shaped housing 108 and has longitudinally spaced shoulder portions 118, 120 and 122 selectively engageable with the fixed stop 114 of the housing 118. The latch strip 116 is welded to a push rod 124 which is mounted in an anchor plate 126 secured to the outer face of the panel 38 so as to permit the push rod 24 to move longitudinally in the anchor plate 126 and to pivot relative thereto.

The push rod 124 has an enlarged head 128 which supports one end of a coil spring 130 which surrounds the push rod 124 and acts between the head 128 and the adjacent edge of the anchor plate 126. It will now be seen that the spring 130, through the push rod 124, holds the latch strip 116 in the position illustrated in FIGURE 16, but permits it to be moved by the operator upon pushing the push rod 124 upwardly, as there illustrated, or to the left as viewed in FIGURE 2, so as to move the latch strip 116 out of engagement with the stop 114. The shoulder portions 118, 120 and 122 on the latch strip 116 are so spaced that when the panel 38 is in the position illustrated in full lines in FIGURE 6, the shoulder 118 will be in engagement with the stop 114 to hold the panel against movement away from the side wall 26 and similarly, when the panel 38 is in the broken line position indicated at 102, the shoulder 120 will be in engagement with the stop 114 and when the panel is in the position indicated at 104, the shoulder 122 will be in engagement with the stop 114.

Figures 4, 5:
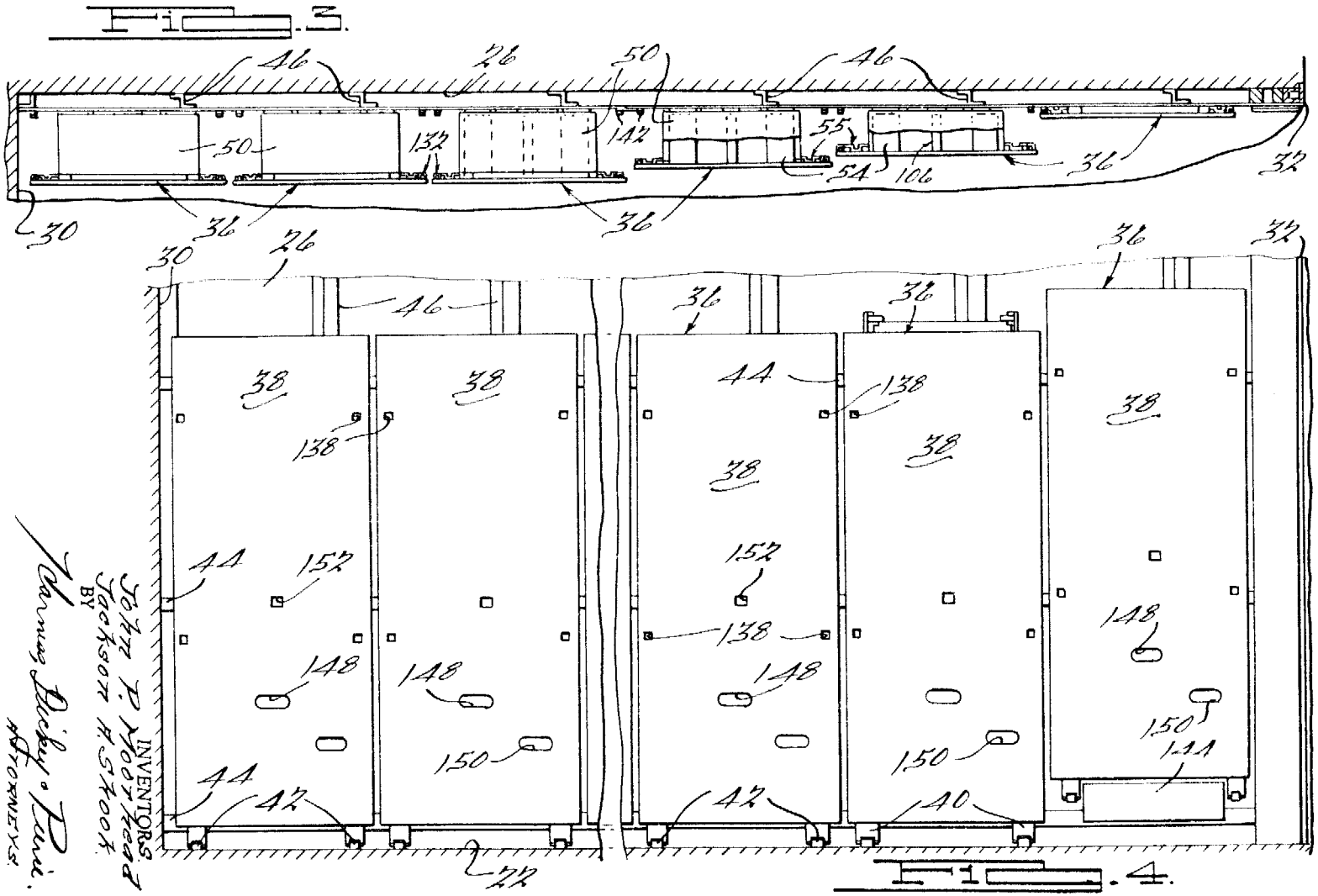
FIGURE 4 is a broken elevational view looking at the structure illustrated in FIGURE 3 from the interior of the boxcar.
FIGURE 5 is an enlarged broken sectional view of the structure illustrated in FIGURE 2 taken substantially along the line 5—5 thereof.

In addition to the three operative positions illustrated in FIGURE 6, the side wall filler 36 may be moved to the stored position illustrated in FIGURE 5 and it will be seen that in moving from the position illustrated in full lines in FIGURE 6, to the stored position of FIGURE 5, the panel 38 must be raised because the leaves 54 must pivot upwardly from the horizontal position illustrated in FIGURE 6 to a vertical position. The panel 38 is held in the stored position illustrated in FIGURE 5 by a pair of hangers 132 in the form of generally rectangularly-shaped closed wire elements, the opposite side portions 134 of which are generally S-shaped as illustrated in FIGURE 13. The hanger elements are secured to the panel 38 by brackets 136 and extend into apertures 138 provided in the panel. The brackets 136 have flange portions 140 which engage the S-shaped side portions 134 to prevent the hanger 132 from pivoting downwardly about its pivotal connection with the bracket 136 beyond the position illustrated in FIGURE 13 so that, as the panel is moved to the stored position illustrated in FIGURE 5, the hanger 132 is disposed in the position illustrated in FIGURE 13 and adapted to be hooked over supports 142 provided on the anchor strips 44. In the preferred embodiment illustrated there are four such hanger elements 132 mounted on each panel 38 and disposed to engage supports 142 provided on the upper and intermediate anchor strips 44.

The lowermost attachment assembly 48 carries a plywood filler strip 144 extending across the bottom of the extensible leaves 54 thereof and secured thereto by screws 146 extending through apertures provided in the sheet metal section 82 of each leaf 54. As illustrated in FIGURE 5, when the side wall filler 36 has been moved to the stored position, this strip 44 fills a portion of the space below the panel 38 and also protects the portion of the lower attachment assembly 48 which is between it and the side wall.

It will now be appreciated that the above described side wall filler may be readily moved from the stored position illustrated in FIGURE 5, to the operative position illustrated in full lines in FIGURE 6, by grasping the panel 38 by means of hand-holds 148 and 150 provided for this purpose and raising the panel to lift the hangers 132 off of the supports 142 and swinging the panel 38 outwardly and downwardly from the side wall. When the panel reaches the full line position illustrated in FIGURE 6, the lock mechanism 106 is in the position illustrated in FIGURE 16 and holds the panel against movement away from the side wall and the leaves 54 hold it against movement toward the side wall. The operator may move the panel to the position 102 illustrated in broken lines in FIGURE 6 by engaging the push rod head 128 through the panel aperture 152 and moving the latch strip 116 to move the shoulder 118 out of engagement with the stop 114, permitting him to pull the panel away from the wall while it is supported on the rollers 42. When the panel reaches the position 102 the intermediate leaves 52 have dropped into horizontal position and the shoulder 120 has moved into engagement with the stop 114 by again moving the push rod 124. The operator may release the lock mechanism 106 and move the panel out to the position 104 in which the large leaves 50 have dropped into horizontal position and the shoulder 122 has moved into engagement with the stop 114. To insure that the leaves 50 are fully down, the operator may place his foot on the end thereof adjacent the panel to press the lowermost leaf 50 fully down and through the tying strips 68 and the leaves 50 of the intermediate and upper attachment assemblies will also be pulled into their final horizontal position.

While only one specific embodiment of the present invention has been illustrated and described in detail herein, it will be readily appreciated by those skilled in the art that numerous modifications and changes may be made without departing from the spirit of the present invention.

What is claimed is:

1. A side wall filler for use in a freight receiving chamber defined in part by a floor and a side wall, said side wall filler comprising a panel disposed parallel to said side wall and adapted to engage freight, means on said panel adapted to support said panel on said floor, a plurality of attachment assemblies connecting said panel to said side wall for movement between a stored position in which said panel is disposed closely adjacent to said side wall and a plurality of operative positions each spaced a different distance from said side wall, each of said attachment assemblies including an anchor strip extending along and secured to said side wall and a plurality of leaves individual to said operative positions and each adapted in one position of said panel to extend horizontally between said panel and said side wall to support said panel against movement toward said side wall and each of said leaves being connected to said anchor strip for pivotal movement relative thereto, locking means connected between one of said anchor strips and said panel and adjustable for selectively and releasably locking said panel in each of said operative positions against movement therefrom in a direction away from said side wall, and co-operating means on at least one of said anchor strips and on said panel for releasably holding said panel in said stored position.

2. A side wall filler as defined in claim 1 wherein said first named means includes a roller adapted to engage the floor and support the panel thereon for rolling movement between said operative positions.

3. A side wall filler as defined in claim 1 wherein one of said leaves is connected to said panel for pivotal movement about an axis fixed relative to said panel and is extensible from a minimum length corresponding to the one of said operative positions in which said panel is closest to said side wall to a maximum length corresponding to the one of said operative positions in which said panel is farthest from said side wall, and onother of said leaves is of a fixed length substantially equal to said maximum length of said one leaf and is connected to said panel for pivotal movement relative thereto and for sliding movement vertically therealong.

4. A side wall filler as defined in claim 3 including at least one leaf intermediate said one and said another of said leaves and disposed to horizontally overlie said extensible leaf when said panel is in one of said operative positions intermediate said closest position and said farthest position and to support said panel against movement therefrom in a direction toward said side wall.

5. A side wall filler as defined in claim 4 wherein said intermediate leaf has a free edge which abuts said panel when said panel is in said intermediate position and is spaced therefrom when said panel is in said farthest position.

6. A side wall filler as defined in claim 3 including means mounted on said panel and connected between said attachment assemblies so that the said sliding movement of the said another leaf of each attachment assembly is substantially the same.

7. A side wall filler as defined in claim 3 wherein each of said attachment assemblies includes a pair of said extensible leaves spaced laterally of said panel and said co-operating means is disposed intermediate said pair of extensible leaves.

8. A side wall filler as defined in claim 4 wherein said intermediate leaf is hinged to said fixed length leaf for pivotal movement about an axis substantially coaxial with the axis of pivotal movement of said fixed length leaf relative to said anchor strip.

9. A side wall filler as defined in claim 1 wherein said locking means includes an elongated latch housing pivotally mounted on one of said anchor strips and having a stop surface facing along said housing toward said anchor strip, an elongated latch strip having a plurality of latching shoulders spaced therealong, said latch strip being telescopically received in said housing for movement longitudinally and transversely thereof for selectively moving said latching shoulders into engagement with said stop surface, and means mounting said latch strip on said panel for pivotal movement relative thereto and for movement transversely of said housing.

10. A side wall filler as defined in claim 1 wherein said co-operating means comprises upwardly extending supports on at least one of said anchor strips, keeper elements mounted on said panel and adapted to engage said supports to hold said panel in said stored position and co-operating means on said keeper elements and on said panel holding said keeper elements in position to engage said supports.

*11. A freight bracing device for bracing freight at a spaced distance from a wall of a freight receiving chamber comprising a freight bracing panel defining a surface for engaging freight, a link adapted to be pivotally connected at one of its ends to the wall for pivotal movement relative to the wall about a horizontally disposed pivot axis, a support member, means pivotally connecting the other end of said link to said support member for moving said support member relative to the wall upon pivotal movement of said link, said other end of said link moving through an arc about said horizontal axis in a path having a vertical component for movement of said support member vertically as said support member moves*

*horizontally relative to the wall, said support member being in sliding interengaging relationship with means fixed relative to said freight bracing panel for moving said freight bracing panel horizontally relative to the wall upon pivotal movement of said link and for sliding movement of said freight bracing panel; in a vertical direction relative to said freight bracing panel upon such movement and means providing vertical support for said freight bracing panel during the sliding movement of said support member relative to said freight bracing panel.*

*12. A freight bracing device as set forth in claim 11 wherein the freight bracing panel has a plurality of operative positions spaced different distances from the wall and further including latching means for locking said panel in each of said positions.*

References Cited

The following references, cited by the Examiner, are of record in the patented file of this patent or the original patent.

UNITED STATES PATENTS

| | | | |
|---|---|---|---|
| 1,206,648 | 11/1916 | Bacon | 105—369 |
| 1,833,016 | 11/1931 | Chandler | 105—369 |
| 1,963,545 | 6/1934 | Campbell et al. | 105—369 |
| 2,086,283 | 7/1937 | Pierce | 105—369 |
| 2,424,768 | 7/1947 | Nalbandian | 105—369 |
| 2,752,864 | 7/1956 | McDougal, Sr., et al. | 105—376 |
| 2,819,810 | 1/1958 | De Witt. | |
| 2,828,804 | 4/1958 | Schwinn. | |
| 2,885,221 | 5/1959 | Weeks | 280—179 |
| 2,958,873 | 11/1960 | Ferneau. | |
| 3,017,843 | 1/1962 | Loomis et al. | 105—376 |
| 3,220,037 | 2/1962 | Stallard. | |
| 3,163,130 | 12/1964 | Lundvall | 105—369 |
| 3,212,458 | 10/1965 | Robertson | 105—369 |

DRAYTON E. HOFFMAN, *Primary Examiner.*